United States Patent Office 3,417,274
Patented Dec. 17, 1968

3,417,274
METALLIC MEMBERS FOR INSERTION INTO GLASS
Robert W. Bennett, Corning, and Lloyd G. Sprague, Bath, N.Y., assignors to Corning Glass Works, Corning, N.Y., a corporation of New York
Filed Sept. 27, 1966, Ser. No. 582,282
5 Claims. (Cl. 313—89)

ABSTRACT OF THE DISCLOSURE

A metallic member for insertion into a glass body for support of a load. Such body and load may, for example, be the skirt portion of a glass television picture tube viewing panel and a part of an aperture mask for such a panel, respectively.

---

Figure 1:
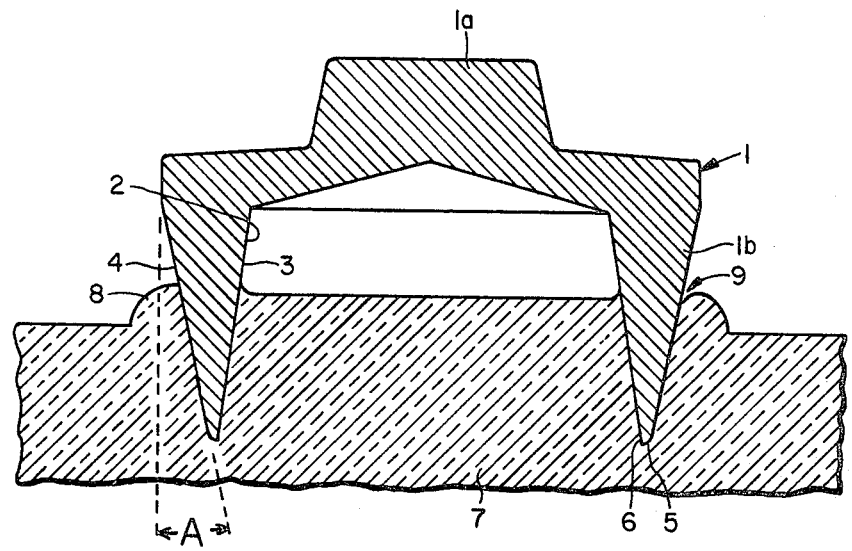

The present invention relates to support elements or members for insertion and sealing in the face plate or viewing panel of a television picture tube. More specifically, the invention relates to metallic elements or members which are to be inserted and sealed in the skirt portion of a face plate of a cathode-ray television picture tube for support of an electronic element to be later mounted within the hollow of said face plate.

There is disclosed, for example, in Letters Patent of the United States 2,949,702, issued Aug. 23, 1960 to W. S. Blanding et al., a method of insertion and sealing hollow metal inserts in the skirt portion of a skirted glass article such as the viewing screen or face plate portion of an all-glass television picture tube, said metal inserts being provided for the purpose of supporting an aperture mask within the hollow of said face plate portion. Reference character 63 in FIGS. 1, 2, 7 and 8 of the patent designates a hollow metal insert which is inserted, as illustrated in FIG. 8 of the patent, through the wall surface 62 of a television picture tube viewing panel P and is sealed within the glass of the viewing panel as discussed in said patent.

Heretofore, the metal insert elements or members, such as member 63 shown in the Blanding et al. patent, were each provided with a skirt or glass insertion portion whose outside surface uniformly tapers at a maximum angle of 12° towards the axis of the insert member, while, using the method of said patent, said insert members were satisfactorily inserted and sealed into the skirt portions of the viewing panels or face plates of television picture tubes in the majority of instances, for economic reasons it has become increasingly expedient to provide for an even higher selection of face plates or viewing panels having the insert or support members satisfactorily sealed therein. That is, in order to help reduce the average cost of television picture tubes having face plates or viewing panels with the metal insert or support members provided therein, it has been found expedient to search for ways and means for improvement of the sealing of such support members in the face plates or viewing panels, thereby providing for a higher percentage of approved panels from each quantity of panels in which the support members are inserted and sealed. Accordingly, the metal insert or support member having the configuration herein described was developed to provide for improved sealing between each such member and the glass of a face plate or viewing panel in which it is inserted.

In the light of the above discussion, it is an object of the present invention to provide an improved support member for insertion and sealing into the skirt portion of a face plate or viewing panel for an all-glass television picture tube.

In accomplishing the above object of the invention there is provided a support member whose skirt portion, that is, whose glass entering or insertion portion, has a configuration differing from that of the support members heretofore employed.

Other objects and characteristic features of the invention will become apparent as the description proceeds.

Figure 2:
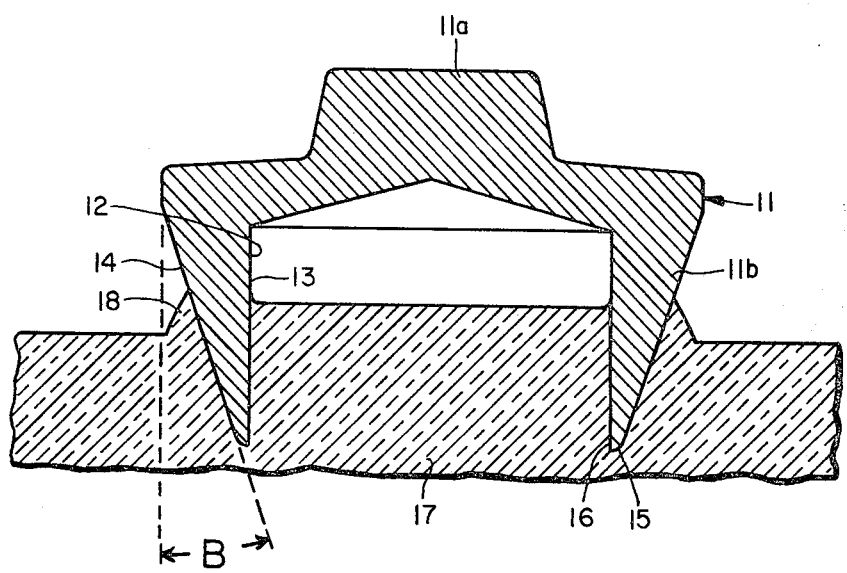

The invention will best be understood with reference to the accompanying drawings wherein:

FIG. 1 is a diametric cross-sectional view of a support member such as heretofore employed and illustrated as inserted and sealed into a glass body; and FIG. 2 comprises a view similar to FIG. 1 but illustrating the configuration of the improved support member in accordance with the invention.

Referring to the drawing in detail, there is shown in FIGS. 1 and 2 the respective support members 1 and 11, respectively. It will be noted that members 1 and 11 are each shown as having identical tapered portions 1a and 11a, respectively, each of which are of a lesser diameter than the remainder of the respective member. These portions of the support members are intended to provide a seating portion for an electronic element, such as an aperture mask, to be provided within the hollow of a viewing panel or face plate in which the support members are inserted and sealed. This is now well known in the art and reference may be made to the previously cited Blanding et al. patent if further information is desired.

Portion 1b of support member 1 (FIG. 1) opposite support portion 1a, is the glass entering or insertion portion of the support member. Portion 1b overall is substantially of a frustoconical configuration and is provided with a hollow or cavity 2 which is also substantially of a frustoconical configuration. Inner and outer wall surfaces 3 and 4, respectively, of portion 1b converge to form an annular rim 5 defining an entrance or opening 6 leading into cavity or hollow 2. As previously mentioned, outer surface 4 of portion 1b of a support member, such as 1, uniformly tapers at a maximum angle of 12° toward the axis of the support member. This angle is indicated by the letter A shown in FIG. 1.

When a member such as 1 is heated and inserted into a glass body, such as 7 (FIG. 1), in the manner and by the method discussed in the afore-cited Blanding et al. patent, a fillet of glass such as 8 is formed by the softened glass flowing up the outside of the support member. Such a fillet of glass provides a satisfactory glass-to-metal seal. However, as illustrated in FIG. 1, the fillet of glass sometimes falls away from the support member to form a re-entrant angle, such as 9, thereby providing a possibly unsatisfactory or unacceptable glass-to-metal seal. As previously discussed, glass body 7 may, for example, be the skirt portion of a television picture tube viewing panel or face plate.

Referring now to FIG. 2, the improved support member 11 will be discussed in detail.

The glass entering or insertion portion of member 11 is designated by the reference character 11b and corresponds to portion 1b of member 1 in FIG. 1. Portion 11b is also substantially of frusto-conical configuration and has a hollow or cavity 12 provided therein. Hollow or cavity 12 has a substantially cylindrical configuration rather than the frustoconical configuration of cavity 2 of member 1 and the axis of such cavity coincides with that of portion 11b of member 1. Inner and outer wall surfaces 13 and 14, respectively, of portion 11b converge to form an annular rim 15 defining an entrance or opening 16 leading into cavity or hollow 12. Outer surface 14 of portion 11b tapers toward the axis of support member 11 and, thereby, toward inner surface 13, at an angle which is indicated by the letter B and which is somewhat greater than the 12° angle A of FIG. 1. Extensive experimentation has disclosed that angle B may be any angle in the range of from 14° to 20° and improved glass-to-metal sealing characteristics over those of the so-called 12° member of FIG. 1 are attained. However, it has been found by such experimentation that optimum glass-to-metal sealing characteristics are attained when angle B is an 18° angle.

When a member such as 11, having an 18° angle B, is heated and inserted into a glass body, such as 17 and which may, for example, be the skirt portion of a television viewing panel or face plate, a fillet of glass such as 18 is formed by the softened glass flowing up the outside of the support member. It will be noted that glass fillet 18 has a considerably less convex configuration than the glass fillet 8 of FIG. 1 and, therefore, the possibility of the formation of a re-entrant angle, such as angle 9 of FIG. 1, is substantially reduced or eliminated. It is also pointed out that a support member such as 11, as compared to a member such as 1, can be inserted deeper into a glass body before the fillet glass extends above or beyond similar prescribed limits on the periphery of the glass insertion portion of the respective members. This feature is attained because the amount of glass forced into the fillet area, when a member, such as 11, is inserted into a glass body, is less than when a member, such as 1, is similarly inserted into a glass body. Furthermore, a support member such as 11, that is, a member whose glass entering or insertion portion tapers at an angle in the range of from 14° to 20°, provides better wetting of the member by the glass than does the so-called 12° member of FIG. 1. This is believed to be a result of the greater force against the reduced amount of glass flowing into the fillet area when a member, such as 11, is inserted into a glass body as compared to when a member, such as 1, is likewise inserted.

It is pointed out that an optimum glass-to-metal seal is attained when a support member, such as 11, is employed in conjunction with apparatus for electrical induction heating of the member for insertion into a glass body. However, when a member, such as 11, is heated and inserted into a glass body by the method and apparatus described in the aforecited Blanding et al. patent, there is also attained improved glass-to-metal sealing characteristics over those attained by a similar insertion of a member such as 1.

Although there is herein shown and described only a single embodiment of the invention, it is to be understood that such is not intended to be in any way limiting but that various changes and modifications may be made therein within the scope of the appended claims without departing from the spirit and scope of the invention.

What is claimed is:

1. A metallic member for insertion into a glass body for support of a load, such member comprising, a support portion and a glass insertion portion the support portion being of a lesser diameter than the glass insertion portion and of a configuration suitable for support of said load thereon, and said glass insertion portion having a frustoconical configuration and embodying a cylindrical cavity, such portion and cavity having a common axis, the outer surface of said glass insertion portion uniformly tapering toward said axis at an angle in the range of from 14° to 20° and converging at a corresponding angle with the inner surface defining the perimetric limits of said cavity to form an annular wedge-like rim for insertion of such glass insertion portion into said glass body.

2. A member in accordance with claim 1 and in which said load is part of an aperture mask, said glass body is the skirt portion of a viewing panel for a television picture tube, said support portion protrudes from said glass insertion portion for partial support of said aperture mask, and said angle is an 18° angle.

3. A metallic member for insertion into a glass body for support of an electronic element, such member comprising, a hollow frustoconical glass insertion portion and an element support portion, the hollow in said glass insertion portion having a cylindrical configuration and an axis which coincides with that of such portion, the outer surface of said glass insertion portion uniformly tapering toward said axis and converging at an angle within the range of 14° to 20° with the inner surface defining the perimetric limits of said hollow to form a wedge-like rim for insertion into said glass body; and said support portion protruding from said glass insertion portion at the end thereof opposite and in a direction away from said rim, such support portion having a configuration suitable for support of said electronic element.

4. A member in accordance with claim 3 and in which said angle is an 18° angle.

5. A member in accordance with claim 3 and in which said electronic element is an aperture mask, said glass body comprises the skirt portion of a television picture tube viewing panel, and said angle is an 18° angle.

References Cited

UNITED STATES PATENTS

| | | | |
|---|---|---|---|
| 2,457,144 | 12/1948 | Goodale | 65—59 |
| 2,878,623 | 3/1959 | Vincent | 315—85 X |
| 2,949,702 | 8/1960 | Blanding et al. | 65—41 |
| 3,004,182 | 10/1961 | Pfaender | 313—85 X |

JAMES W. LAWRENCE, *Primary Examiner.*

V. LAFRANCHI, *Assistant Examiner.*

U.S. Cl. X.R.

65—59, 154; 313—240